Nov. 2, 1937.  C. B. STRAUCH  2,097,846

NASAL INHALER

Filed Dec. 31, 1935

Inventor
Clauss Burkart Strauch,

By Seymann + Bright
Attorneys

Patented Nov. 2, 1937

2,097,846

UNITED STATES PATENT OFFICE 2,097,846

NASAL INHALER

Clauss Burkart Strauch, New York, N. Y.

Application December 31, 1935, Serial No. 56,904

5 Claims. (Cl. 128—198)

This invention relates to nasal inhalators, inhale filters for air and smoke and inhale medicators consisting of thin-walled, semi-elastic, preferably transparent, imperforate, tubular shells, adapted for insertion into facial openings such as mouth or nose, and preferably provided with an absorbent filler adapted to filter air or smoke and preferably to carry at the same time medications through the inhaled air.

This application represents a continuation in part of my application Serial No. 9,395, filed March 5, 1935, on Nasal inhalers, and relates to improvements in shape and to enlarged scope of use of my inhaler. A process of manufacture of such inhalers or the like is the subject of a separate application of mine, Serial No. 56,905 filed December 31, 1935 and entitled method for Continuous thermoplastic forming.

I have found that inhalers according to my invention and consisting of a tubular shell formed of smooth, non-absorbent, preferably transparent, semiflexible material and containing a filler of absorbent material could be made in such shape, which will make them still less visible, when applied, prevent, securely, direct contact between mucous membrane and medications and hold them firmly in their position in the nostril, so as to even permit application over night and during sleep.

Furthermore, I have found that nasal inhalers according to my invention could be adapted with only slight changes for use as oral inhale filters to be used preferably to filter and optionally medicate tobacco smoke inhaled from cigarettes and cigars.

Nasal inhalators and inhale filters according to my invention proved, furthermore, a simple means to apply practically any type of volatile medicament with the inhaled air or smoke, such as etheric oils, camphor, menthol, amyl nitrite, bromoform and bromine, esters, and anesthetics for inducing stimulation or sedation, or other medicinal effect. The volatile drugs may be contained in the absorbent filler applied there during manufacture or may be supplied separately and applied before use. Inhalators and inhale filters used for application of volatile drugs are termed inhale medicators.

Heretofore nasal inhalators, inhale filters for air and smoke, and inhale medicators have been devised, consisting of constructions using metal, glass, horn, hard rubber or wood, noticeable and offensive on the face, apt to cause damage through the inherent stiffness of the material, of expensive structure necessitating repeated use which is objectionable even after cleaning of such devices with difficulty, and of such weight that they could be held in place only with considerable pressure and discomfort.

Inhale filters for tobacco smoke, designed to keep out part of the nicotin and chiefly the harmful and unwanted constituents of the smoke have been devised in the shape of or as parts of cigarette or cigar tips or pipes, expensive in use, difficult to clean, making special and clumsy appliances and procedures necessary. They have also been devised as part of the cigarettes or cigars themselves, confining the use to certain brands, making medication difficult, and increasing the cost greatly.

An object of my invention is to provide nasal inhalers, inhale filters and inhale medicators made of unoffensive and even transparent material; semiflexible and elastic; made so cheap and simple that each is to be used only once; of such low weight and such shape that it can be held without pressure or discomfort, and of such ease of application as to make their use practical.

With the foregoing objects outlined and with other objects in view which will appear as the description proceeds, the invention consists in the novel features hereinafter described in detail, illustrated in the accompanying drawing and more particularly pointed out in the appended claims.

Figure 1:
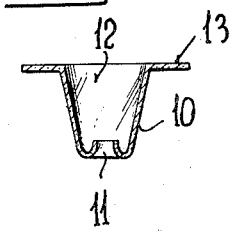
Fig. 1 is a vertical sectional view of one form of the tubular shell of my improved article.

Fig. 1 shows a vertical sectional view of the basic form of the imperforate tubular shell of the device, representing essentially a cup, 10, with central perforation 11, having bent-in edges, a cavity 12, and an optional outwardly extending flange 13.

Figure 2:
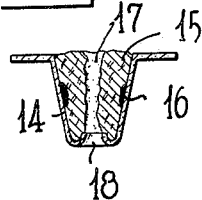
Fig. 2 is a vertical sectional view of the same with a tubular absorbent filler secured therein.

Fig. 2 represents a similar tubular shell, 14, filled with an absorbent filler 15, held by a strip of glue 16 and provided with a central air passage 17. The bent-in edges of the perforation 18 prevent contact between the medicated filler and the mucous membrane when in use. A device finished according to this figure represents the basic form of a nasal inhaler, according to my invention. Such inhaler, however, substantially of the shape of a round cone with central air passage and a round flange, proved difficult to hold in the nostril especially during sleep.

Figure 3:
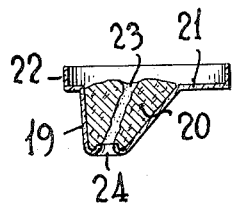
Fig. 3 is a view similar to Fig. 2 but illustrating a modification.

It is an essential part of my invention to produce cup-shaped inhalers according to Fig. 3 which represents a vertical sectional view, showing the cone shaped cup 19 and its filler 20 set at an angle to the flange 21 which is provided with an optional right angle or rolled brim 22, while the air passage 23 runs also at an angle to the flange and opens through the perforation 24, preferably surrounded by bent-in edges.

Figure 4:
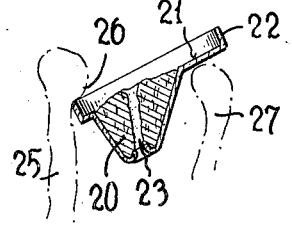
Fig. 4 is a diagrammatic sectional view showing the article of Fig. 3 inserted in a person's nostril.
Figure 5:
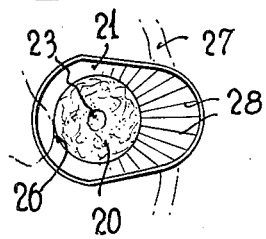
Fig. 5 is a bottom plan view of the article shown diagrammatically arranged in the nostril.

Fig. 4 shows a device according to Fig. 3 in use and applied to the nose in a vertical sectional view, 25 representing the nasal septum, 26 the prominent fold near the free end of the septum and 27 the lateral wall of the nose. It is apparent that the device is firmly anchored behind the prominent fold 26 while the air passage 23 is in line with the normal flow of inhaled air. Inhalers of this shape will hold well overnight during sleep, and be rather invisible when used in daytime. Fig. 5 corresponds to Fig. 4, but represents a frontal view of the inhaler placed into a nostril for use, anchored between the fold 26 and lateral nasal wall 27. The figure also shows the preferred elliptic shape of the flange 21, while the lines 28 represent optional corrugations to increase strength.

Figure 6:
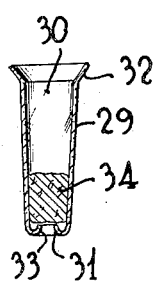
Fig. 6 is a sectional view of a modification forming a cigarette holder or mouthpiece.
Figure 7:
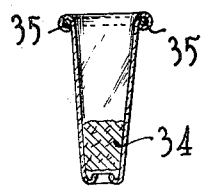
Fig. 7 is a similar view of a slightly modified cigarette holder.

Inhalators to be used for filtering the inhaled air against smoke or dust may be constructed according to Fig. 2 or 3 but are preferably filled with an absorbent material not provided with a central air canal, the filler arranged so loosely that the air may be inhaled through. Fig. 6 represents such a type of inhaler and filter, especially adapted for oral use and for connection to a cigar or cigarette whose smoke is to be filtered while being inhaled. Such a device can be termed a filtering cigarette tip. In Fig. 6, 29 represents the outer tubular imperforate shell, provided with a conical entrance 30 on one side and a smaller exit 31 on the other end, the first optionally enforced by a straight, curved or rolled flange 32, the latter preferably with bent-in edges, 33, keeping the absorbent filter 34 from contact with the tongue when in use. Fig. 7 shows the same device as Fig. 6 distinguished however by an enforcing ring 35, preferably made from wire, permitting a deeper draw of the thin material in manufacture, enforcing greatly the entrance of the device, which is to hold the cigarette by friction and to render it possible more easily to pack such filter cups simply by arranging one within the other, in the same axis, preferably held by friction from slight projections provided in the walls of the device or held by friction provided through interposed preferably ringshaped layers of other material such as paper.

The absorbent fillers may consist of cotton fibre, preferably spun from coiler cotton on spindles, or formed by pressure and cut, or as suitable for the filtering variations, cut from formed sticks of so-called dental cotton, or of any other suitable absorbing and filtering material such as charcoal, wool, glasswool, cellulosic fibres and the like. The absorbent fillers may be medicated during manufacture with volatile drugs such as menthol, camphor, etheric oils, amyl nitrite, anesthetics, bromine, its derivatives or the like, or such volatiles may be supplied separately to be applied before use. For preparing absorbent fillers for filtering of tobacco smoke it proved practical to impregnate fibers such as cotton with albumen kept moist by addition of a non-drying liquid such as glycerin, or by impregnating the filler with oils or other chemicals specially suited to neutralize and absorb nicotine and acrid ingredients of the smoke.

Figure 8:
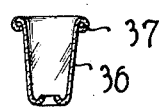
Fig. 8 is a vertical sectional view of the tubular shell of another cigarette holder.

Without deviating from the principle of my invention tubular shells as shown in Fig. 1 may also be used advantageously without absorbent fillers preferably in form as shown in Fig. 8, suited for being attached to mouthpieces and cigarettes for preventing contact of lips and mouth with paper and tobacco and consisting of a slightly cone-shaped tubular cup 36 preferably with an enforcing flange 37.

Inhalers, and the like according to my invention can easily and cheaply be made by pressing a pliable or preferably thermoplastic and preferably transparent material between dies and successively applying glue and an absorbent filler. I prefer to carry out my invention, however, forming the shells by heating a bandshaped thermoplastic material, preferably paper thin, while held under tension to avoid shrinkage due to the heat, to transport the heated band quickly to cold dies while still held under tension and to form the cups between the cold dies, still as parts of the strip, which is subjected to additional operations such as punching holes, applying glue and applying the absorbent filler until the finished inhaler or the like is blanketed out. As thermoplastic material to be used in such process I find practical any thermoplastic material prepared in sheets, bands or rods, and especially cellulose acetate and other cellulosic compounds or resinous plastics. A formed shell according to my invention generally weighs about 1 grain (1/15 gm.), has a wall thickness of about .005" and may or may not show pleated folds. Such paper thin shell is sufficient means, however, to give form and shape to the absorbent filter, to facilitate removal, to furnish hold and engagement, and to prevent, securely, contact between the highly irritating volatile drugs or the filtered poisons and the sensitive mucous membrane.

In the first portion of this specification, I have set forth the advantages of the invention over the known systems and while I have disclosed what I consider to be some preferred embodiments of the invention in such manner that the same may be readily understood by those skilled in the art, it is manifest that changes may be made in the details disclosed without departing from the spirit of the invention as expressed in the claims.

What I claim and desire to secure by Letters Patent is:

1. An article of the character described comprising a substantially conical imperforate open ended tubular shell formed from thin cellulosic sheet material and being light, smooth, flexible and non-absorbent, the shell being provided at its large end with an annular flange extending outwardly away from the axis of the shell, a filling of absorbent material positioned within the shell, the small end of the shell being provided with an annular lip extending inwardly into the bore of the shell and engaging the filling to prevent the latter from reaching the small end of the shell, said outwardly extending flange being eccentrically arranged relatively to the axis of the shell.

2. An article of the character described comprising a substantially conical imperforate open ended tubular shell formed from thin cellulosic sheet material and being light, smooth, flexible and non-absorbent, the shell being provided at its large end with an annular flange arranged at an obtuse angle to the axis of the shell and extending outwardly away from said axis, and a filling of absorbent material positioned within the shell.

3. An article of the character described comprising a substantially conical imperforate open ended tubular shell formed from thin cellulosic sheet material and being light, smooth, flexible and non-absorbent, the shell being provided at its large end with an annular flange arranged at an obtuse angle to the axis of the shell and extending outwardly away from said axis, and a filling of absorbent material positioned within the shell, said flange being eccentrically arranged relatively to the axis of the shell and having an annular lip extending about the edge portion of the flange.

4. An article of the character described comprising a distorted conical imperforate open ended tubular shell of thin cellulosic material and being light, smooth, flexible and non-absorbent, the shell being provided at its large end with an annular flange extending outwardly away from the axis of the shell and arranged eccentrically relatively to said axis, a filling of absorbent material secured within the shell, the small end of the shell being provided with an annular lip extending inwardly into the bore of the shell and engaging the filling to prevent the latter from reaching the small end of the shell.

5. An article of the character described comprising a distorted conical imperforate open ended tubular shell of thin cellulosic material and being light, smooth, flexible and non-absorbent, the shell being provided at its large end with an annular flange extending outwardly away from the axis of the shell and projecting at one side of the shell to a greater extent than at the opposite side of the shell, a filling of absorbent material secured within the shell, the small end of the shell being provided with an annular lip extending inwardly to the bore of the shell and engaging the filling to hold the latter away from the small end of the shell.

CLAUSS BURKART STRAUCH.